US009826353B2

(12) United States Patent
Venkatraman et al.

(10) Patent No.: US 9,826,353 B2
(45) Date of Patent: Nov. 21, 2017

(54) METHODS AND SYSTEMS FOR PRIORITY BASED GEOFENCES

(71) Applicant: QUALCOMM Incorporated, San Diego, CA (US)

(72) Inventors: Sai Pradeep Venkatraman, Santa Clara, CA (US); Aditya Narain Srivastava, Santa Clara, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 15/080,418

(22) Filed: Mar. 24, 2016

(65) Prior Publication Data
US 2017/0280283 A1 Sep. 28, 2017

(51) Int. Cl.
H04W 24/00 (2009.01)
H04W 4/02 (2009.01)
(52) U.S. Cl.
CPC ........... *H04W 4/021* (2013.01); *H04W 4/028* (2013.01); *H04W 4/02* (2013.01)
(58) Field of Classification Search
CPC ........ H04W 4/021; H04W 4/028; H04W 4/02
USPC ............... 455/456.1, 456.3, 456.5, 456.6
See application file for complete search history.

(56) References Cited

U.S. PATENT DOCUMENTS

| 8,971,930 | B2 | 3/2015 | Li et al. | |
| 9,602,970 | B1* | 3/2017 | Mahapatra | H04W 4/022 |
| 2013/0093627 | A1 | 4/2013 | Cosman | |
| 2013/0099977 | A1 | 4/2013 | Sheshadri et al. | |
| 2013/0295970 | A1* | 11/2013 | Sheshadri | G01S 19/52 |
| | | | | 455/456.6 |
| 2014/0162693 | A1* | 6/2014 | Wachter | H04W 4/021 |
| | | | | 455/456.3 |
| 2015/0111523 | A1 | 4/2015 | South | |
| 2015/0181382 | A1 | 6/2015 | McDonald et al. | |
| 2016/0007156 | A1 | 1/2016 | Chiou et al. | |

FOREIGN PATENT DOCUMENTS

WO 2013058954 A1 4/2013

OTHER PUBLICATIONS

Mazumdar S., et al., "Geo-fence driven crowd-sourcing for Emergencies," Proceedings of the ISCRAM 2015 Conference, May 24-27, 2015, 6 pages.
International Search Report and Written Opinion—PCT/US2017/016410—ISA/EPO—Apr. 18, 2017.

* cited by examiner

*Primary Examiner* — Khai M Nguyen
(74) *Attorney, Agent, or Firm* — Muncy, Geissler, Olds & Lowe

(57) ABSTRACT

Methods and systems for utilizing priority based geofences are disclosed. A mobile device receives, from another device over a wireless network, at least one geofence, each of the at least one geofence having an assigned priority level indicating an importance of the at least one geofence, wherein the assigned priority level is one of a plurality of priority levels and is received from the other device over the wireless network, determines, based on the priority level of the at least one geofence, a geofence breach detection method and an evaluation rate, and monitors a position of the mobile device relative to the at least one geofence at the evaluation rate using the geofence breach detection method.

28 Claims, 7 Drawing Sheets

METHODS AND SYSTEMS FOR PRIORITY BASED GEOFENCES

INTRODUCTION

Methods and systems are disclosed herein for providing priority based geofences and the like.

Mobile communications networks are in the process of offering increasingly sophisticated capabilities associated with motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as an E911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc.), such on-board devices may be used to provide relative position, velocity, acceleration, and/or orientation information.

In conventional digital cellular networks, position location capability can be provided by various time and/or phase measurement techniques. For example, in Code Division Multiple Access (CDMA) networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile device may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular and increasingly important SPS wireless technologies which may include, for example, a Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more on-board inertial sensors (e.g., accelerometers, gyroscopes, etc.) to measure an inertial state of the navigation device. Inertial measurements obtained from these on-board inertial sensors may be used in combination with or independent of navigation signals received from satellite and/or terrestrial based transmitters and/or inertial sensors on a vehicle (e.g., accelerometers, gyroscopes, odometers, etc.) to provide estimates of geographic position and heading.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method for utilizing priority based geofences includes receiving, at a mobile device from another device over a wireless network, at least one geofence, each of the at least one geofence having an assigned priority level indicating an importance of the at least one geofence, wherein the assigned priority level is one of a plurality of priority levels and is received from the other device over the wireless network, based on the assigned priority level of the at least one geofence, determining, by the mobile device, a geofence breach detection method and an evaluation rate, and monitoring, by the mobile device, a position of the mobile device relative to the at least one geofence at the evaluation rate using the geofence breach detection method.

An apparatus for utilizing priority based geofences includes a transceiver of a mobile device configured to receive, from another device over a wireless network, at least one geofence, each of the at least one geofence having an assigned priority level indicating an importance of the at least one geofence, wherein the assigned priority level is one of a plurality of priority levels and is received from the other device over the wireless network, and at least one processor of the mobile device configured to determine, based on the assigned priority level of the at least one geofence, a geofence breach detection method and an evaluation rate, and to monitor a position of the mobile device relative to the at least one geofence at the evaluation rate using the geofence breach detection method.

An apparatus for utilizing priority based geofences includes a communication means of a mobile device for receiving, from another device over a wireless network, at least one geofence, each of the at least one geofence having an assigned priority level indicating an importance of the at least one geofence, wherein the assigned priority level is one of a plurality of priority levels and is received from the other device over the wireless network, and a processing means of the mobile device for determining, based on the assigned priority level of the at least one geofence, a geofence breach detection method and an evaluation rate, and for monitoring a position of the mobile device relative to the at least one geofence at the evaluation rate using the geofence breach detection method.

A non-transitory computer-readable medium for utilizing priority based geofences includes at least one instruction to receive, at a mobile device from another device over a wireless network, at least one geofence, each of the at least one geofence having an assigned priority level indicating an importance of the at least one geofence, wherein the assigned priority level is one of a plurality of priority levels and is received from the other device over the wireless network, at least one instruction to determine by the mobile device, based on the assigned priority level of the at least one geofence, a geofence breach detection method and an evaluation rate, and at least one instruction to monitor, by the mobile device, a position of the mobile device relative to the at least one geofence at the evaluation rate using the geofence breach detection method.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
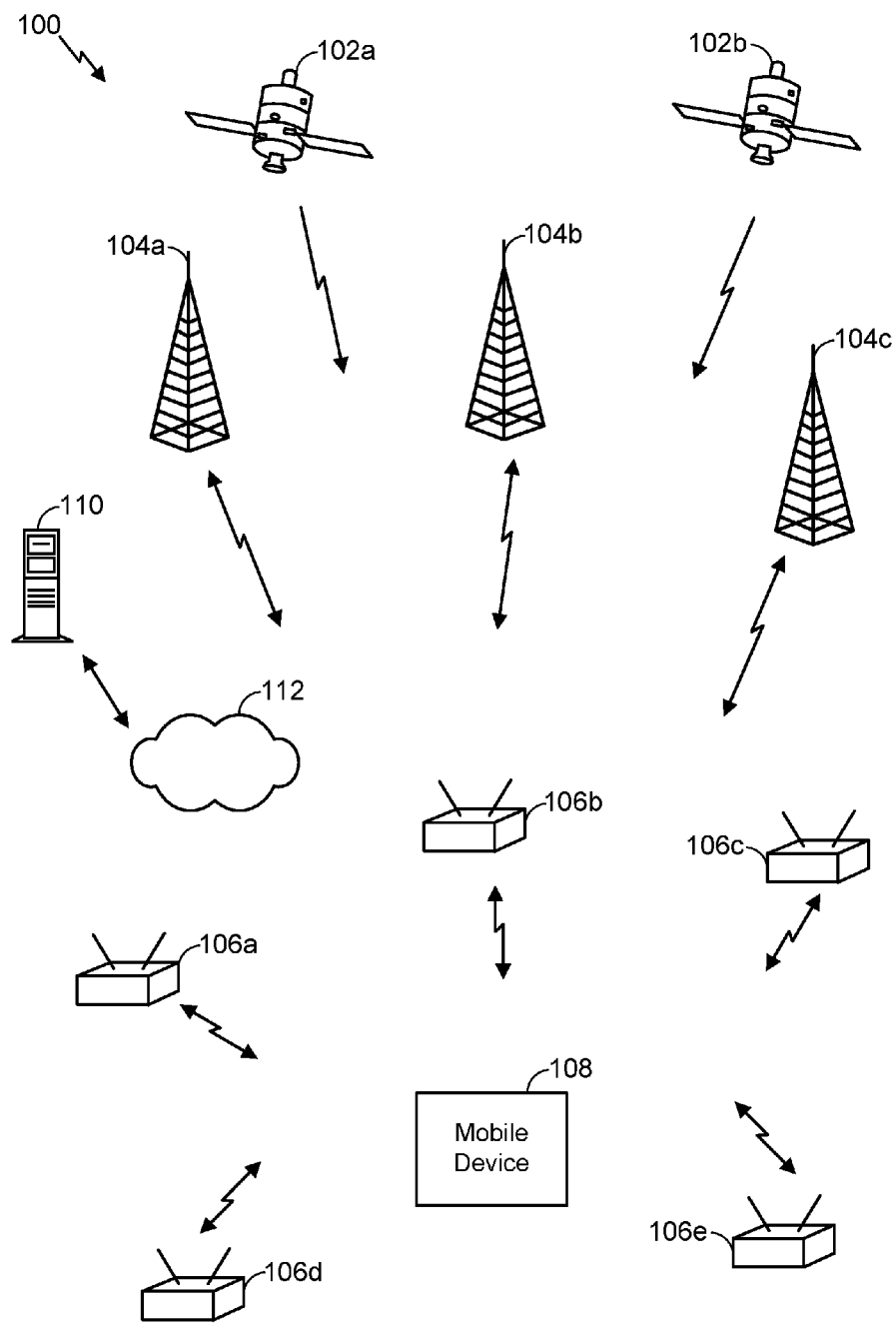
FIG. 1 illustrates an exemplary operating environment for a mobile device that can determine position using wireless techniques, according to one aspect of the disclosure.

Methods and systems for utilizing priority based geofences are disclosed. A mobile device receives, from another device over a wireless network, at least one geofence, each of the at least one geofence having an assigned priority level indicating an importance of the at least one geofence, wherein the assigned priority level is one of a plurality of priority levels and is received from the other device over the wireless network, determines, based on the priority level of the at least one geofence, a geofence breach detection method and an evaluation rate, and monitors a position of the mobile device relative to the at least one geofence at the evaluation rate using the geofence breach detection method.

These and other aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

According to one aspect of the disclosure, FIG. 1 illustrates an exemplary operating environment 100 for a mobile device 108 having wireless positioning capability. The operating environment 100 may contain one or more different types of wireless communication systems and/or wireless positioning systems. In the embodiment shown in FIG. 1, one or more Satellite Positioning System (SPS) satellites 102a, 102b may be used as an independent source of position information for the mobile device 108. The mobile device 108 may include one or more dedicated SPS receivers specifically designed to receive signals for deriving geo-location information from the SPS satellites.

The operating environment 100 may also include one or more Wide Area Network Wireless Access Points (WAN-WAPs) 104a, 104b, 104c, which may be used for wireless voice and/or data communication, and as another source of independent position information for the mobile device 108. The WAN-WAPs 104a-104c may be part of a wireless wide area network (WWAN), which may include cellular base stations at known locations, and/or other wide area wireless systems, such as, for example, Worldwide Interoperability for Microwave Access (WiMAX) (e.g., Institute of Electrical and Electronics Engineers (IEEE) 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, 106d, 106e, which may be used for wireless voice and/or data communication, as well as another independent source of position data. The LAN-WAPs 106a-106e can be part of a Wireless Local Area Network (WLAN), which may operate in buildings and perform communications over smaller geographic regions than a WWAN. Such LAN-WAPs 106a-106e may be part of, for example, WiFi networks (802.11x), cellular piconets and/or femtocells, Bluetooth® networks, etc.

The mobile device 108 may derive position information from any one or more of the SPS satellites 102a, 102b, the WAN-WAPs 104a-104c, and/or the LAN-WAPs 106a-106e. Each of the aforementioned systems can provide an independent estimate of the position for the mobile device 108 using different techniques. In some embodiments, the mobile device 108 may combine the solutions derived from each of the different types of access points to improve the accuracy of the position data. When deriving position using the SPS satellites 102a, 102b, the mobile device 108 may utilize a receiver specifically designed for use with the SPS satellites 102a, 102b that extracts position data, using conventional techniques, from a plurality of signals transmitted by the SPS satellites 102a, 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example, but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation (GAGAN), or GPS and Geo Augmented Navigation system, and/or the like. Thus, as used herein, an SPS may include any combination of one or more global and/or regional navigation satellite systems and/or augmentation systems, and SPS signals may include SPS, SPS-like, and/or other signals associated with such one or more SPS.

Furthermore, the disclosed methods and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each of the WAN-WAPs 104a-104c may take the form of base stations within a digital cellular network, and the mobile device 108 may include a cellular transceiver and processor that can exploit the base station signals to derive position. Such cellular networks may include, but are not limited to, standards in accordance with Global System for Mobile Communication or Groupe Special Mobile (GSM), CDMA, 2G, 3G, 4G, LTE, etc. It should be understood that digital cellular networks may include additional base stations or other resources that may not be shown in FIG. 1. While the WAN-WAPs 104a-104c may actually be moveable or otherwise capable of being relocated, for illustration purposes it will be assumed that they are essentially arranged in a fixed position.

The mobile device 108 may perform position determination using known time-of-arrival (TOA) techniques such as, for example, Advanced Forward Link Trilateration (AFLT). In other embodiments, each of the WAN-WAPs 104a-104c may comprise a Worldwide Interoperability for Microwave Access (WiMAX) wireless networking base station. In this case, the mobile device 108 may determine its position using TOA techniques from signals provided by the WAN-WAPs 104a-104c. The mobile device 108 may determine positions either in a stand-alone mode, or using the assistance of a positioning server 110 and a network 112 using TOA techniques, as will be described in more detail below. Furthermore, various embodiments may have the mobile device 108 determine position information using the WAN-WAPs 104a-104c, which may have different types. For example, some of the WAN-WAPs 104a-104c may be cellular base stations, and other WAN-WAPs 104a-104c may be WiMAX base stations. In such an operating environment, the mobile device 108 may be able to exploit the signals from each different type of WAN-WAP 104a-104c, and further combine the derived position solutions to improve accuracy.

When deriving position using the WLAN, the mobile device 108 may utilize TOA techniques with the assistance of the positioning server 110 and the network 112. The positioning server 110 may communicate to the mobile device 108 through the network 112. The network 112 may include a combination of wired and wireless networks which incorporate the LAN-WAPs 106a-106e. In one embodiment, each LAN-WAP 106a-106e may be, for example, a WiFi wireless access point, which is not necessarily set in a fixed position and can change location. The position of each LAN-WAP 106a-106e may be stored in the positioning server 110 in a common coordinate system. In one embodiment, the position of the mobile device 108 may be determined by having the mobile device 108 receive signals from each LAN-WAP 106a-106e. Each signal may be associated with its originating LAN-WAP 106a-106e based upon some form of identifying information that may be included in the received signal (such as, for example, a media access control (MAC) address)). The mobile device 108 may then sort the received signals based upon signal strength, and derive the time delays associated with each of the sorted received signals. The mobile device 108 may then form a message which can include the time delays and the identifying information of each of the LAN-WAPs 106a-106e, and send the message via the network 112 to the positioning server 110. Based upon the received message, the positioning server 110 may then determine a position, using the stored locations of the relevant LAN-WAPs 106a-106e, of the mobile device 108. The positioning server 110 may generate and provide a message to the mobile device 108 that includes a pointer to the position of the mobile device 108 in a local coordinate system. The message may also include other points of interest in relation to the location of the mobile device 108. When computing the position of the mobile device 108, the positioning server 110 may take into account the different delays which can be introduced by elements within the network 112.

The position determination techniques described herein may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. cdma2000 includes IS-95, IS-2000, and the IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. The techniques may also be used for any combination of a WWAN, WLAN and/or WPAN.

Figure 2:
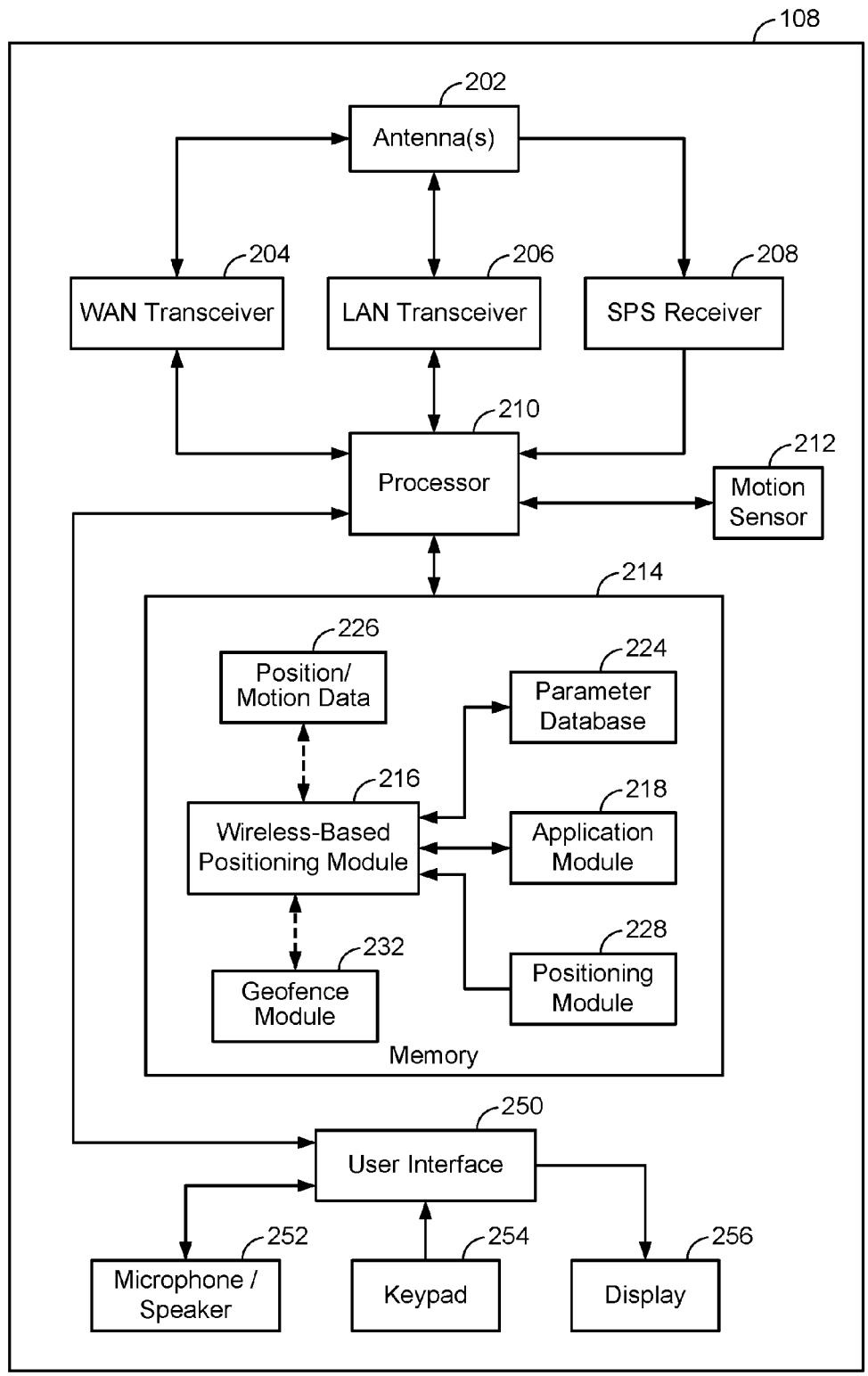
FIG. 2 illustrates an exemplary mobile device that may be used in an operating environment that can determine position using wireless techniques, according to one aspect of the disclosure.

FIG. 2 is a block diagram illustrating various exemplary components of the mobile device 108 in FIG. 1. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile device 108 may include one or more wide area network (WAN) transceiver(s) 204 that may be connected to one or more antennas 202. The WAN transceiver 204 comprises suitable devices, hardware, and/or software for communicating with and/or detecting signals to/from the WAN-WAPs 104a-104c, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 108 may also include one or more local area network (LAN) transceivers 206 that may be connected to the one or more antennas 202. The LAN transceiver 206 comprises suitable devices, hardware, and/or software for communicating with and/or detecting signals to/from the LAN-WAPs 106a-106e, and/or directly with other wireless devices within a network. In one aspect, the LAN transceiver 206 may comprise a WiFi (802.11x) communication system suitable for communicating with one or more wireless access points; however in other aspects, the LAN transceiver 206 may comprise another type of local area network, personal area network, (e.g., Bluetooth®). Additionally, any other type of wireless networking technologies may be used, for example, Ultra Wide Band, ZigBee, wireless Universal Serial Bus (USB) etc.

As used herein, the abbreviated term "wireless access point" (WAP) may be used to refer to the LAN-WAPs 106a-106e and/or the WAN-WAPs 104a-104c. Specifically, in the description presented below, when the term "WAP" is used, it should be understood that embodiments may include a mobile device 108 that can exploit signals from a plurality of LAN-WAPs 106a-106e, a plurality of WAN-WAPs 104a-104c, or any combination of the two. The specific type of WAP being utilized by the mobile device 108 may depend upon the environment of operation. Moreover, the mobile device 108 may dynamically select between the various types of WAPs in order to arrive at an accurate position solution. In other embodiments, various network elements may operate in a peer-to-peer manner, whereby, for example, the mobile device 108 may be replaced with the WAP, or vice versa. Other peer-to-peer embodiments may include another mobile device (not shown) acting in place of one or more WAP.

An SPS receiver 208 may also be included in the mobile device 108. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the position of the mobile device 108 using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206, and the SPS receiver 208.

By way of example, the motion sensor 212 may utilize an accelerometer (e.g., a Microelectromechanical Systems (MEMS) device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, the LAN transceiver 206, the SPS receiver 208, and the motion sensor 212. The processor 210 may include one or more microprocessors, microcontrollers, and/or digital signal processors that provide processing functions, as well as other calculation and control functionality. The processor 210 may include any form of logic suitable for performing at least the techniques provided herein. The processor 210 may also include memory 214 for storing data and software instructions for executing programmed functionality within the mobile device 108. The memory 214 may be on-board the processor 210 (e.g., within the same integrated circuit package), and/or the memory 214 may be external memory to the processor and functionally coupled over a data bus. The functional details associated with aspects of the disclosure will be discussed in more detail below.

A number of software modules and data tables may reside in the memory 214 and be utilized by the processor 210 in order to manage both communications and positioning determination functionality. As illustrated in FIG. 2, the memory 214 may include and/or otherwise receive a wireless-based positioning module 216, an application module 218, a positioning module 228, and a geofence module 232. One should appreciate that the organization of the contents of the memory 214 as shown in FIG. 2 is merely exemplary, and as such the functionality of the modules and/or data structures may be combined, separated, and/or be structured in different ways depending upon the implementation of the mobile device 108.

The application module 218 may be a process running on the processor 210 of the mobile device 108, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the mobile device 108 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in the memory 214 in a position/motion data module 226. In other embodiments, the motion sensor 212 may be provided data which should be further processed by the processor 210 to derive information to perform the calibration. For example, the motion sensor 212 may provide acceleration and/or orientation data (single or multi-axis) which can be processed using the positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, a WAP's position in a common coordinate frame, various parameters associated with the network, initial processing delay estimates, etc.

In other embodiments, the additional information may optionally include auxiliary position and/or motion data which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the mobile device 108 operates.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT (Round Trip Time) techniques (e.g., AFLT within a CDMA network). In certain implementations, the motion sensor 212 and/or the SPS receiver 208 may provide all or part of the position/motion data without further processing by the processor 210. In some embodiments, the position/motion data may be directly provided by the motion sensor 212 and/or the SPS receiver 208 to the processor 210.

As will be appreciated, an embodiment of the disclosure can include a mobile device (e.g., mobile device 108) including the ability to perform the functions described herein. As will be appreciated by those skilled in the art, the various logic elements can be embodied in discrete elements, software modules executed on a processor or any combination of software and hardware to achieve the functionality disclosed herein. For example, the processor 210, the memory 214 (including the wireless-based positioning module 216, the application module 218, the geofence module 232, etc.), and transceivers 204, 206, and 208 may all be used cooperatively to store, load, and execute the various functions disclosed herein, and thus the logic to perform these functions may be distributed over various elements. Alternatively, the functionality could be incorporated into one discrete component, for example, the geofence module 232.

For example, the WAN transceiver 204 and/or the LAN transceiver 206 (depending on the availability of a WAN or LAN, user preferences regarding the download of data, etc.) may be configured to receive, from another device over a wireless network (e.g., a WAN or LAN), at least one geofence. As described herein, each of the at least one geofence may have an assigned priority level indicating an importance of the at least one geofence, wherein the assigned priority level is one of a plurality of priority levels and is received from the other device over the wireless network. The processor 210, cooperatively with the modules in the memory 214, may be configured to determine, based on the assigned priority level of the at least one geofence, a geofence breach detection method and an evaluation rate. The processor 210, cooperatively with the modules in the memory 214 and the WAN transceiver 204, the LAN transceiver 206, and/or the SPS transceiver 208, may be further configured to monitor a position of the mobile device relative to the at least one geofence at the evaluation rate using the geofence breach detection method.

As such, the WAN transceiver 204 and/or the LAN transceiver 206 may be a communication means of a mobile device for receiving, from an other device over a wireless network, at least one geofence, each of the at least one geofence having an assigned priority level indicating an importance of the at least one geofence, wherein the assigned priority level is one of a plurality of priority levels and is received from the other device over the wireless network. Similarly, the processor 210 may be a processing means of the mobile device for determining, based on the assigned priority level of the at least one geofence, a geofence breach detection method and an evaluation rate, and for monitoring a position of the mobile device relative to the at least one geofence at the evaluation rate using the geofence breach detection method.

Note that while the modules shown in FIG. 2 are illustrated as being contained in the memory 214, it is recognized that in certain implementations such procedures may be provided for, or otherwise operatively arranged, using other or additional mechanisms. For example, all or part of the wireless-based positioning module 216, the application module 218, and/or the geofence module 232 may be provided in firmware. Additionally, while in this example the wireless-based positioning module 216, the application module 218, and the geofence module 232 are illustrated as being separate features, it is recognized, for example, that such procedures may be combined together as one procedure or perhaps with other procedures, or otherwise further divided into a plurality of sub-procedures.

The mobile device 108 may include a user interface 250 which provides any suitable interface systems, such as a microphone/speaker 252, a keypad 254, and a display 256 that allows user interaction with the mobile device 108. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit liquid-crystal display (LCD), and may further include a touch screen display for additional user input modes.

As used herein, the mobile device 108 may be any portable or movable device or machine that is configurable to acquire wireless signals transmitted from, and transmit wireless signals to, one or more wireless communication devices or networks. As shown in FIG. 1 and FIG. 2, the mobile device 108 is representative of such a portable wireless device. Thus, by way of example but not limitation, the mobile device 108 may include a radio device, a cellular telephone device, a computing device, a personal communication system (PCS) device, or other like movable wireless communication equipped device, appliance, or machine. The term "mobile device" is also intended to include devices that are, or communicate with, a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, tablets, etc. that are capable of communication with a server, such as via the Internet, WiFi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, vehicular navigation device, laptop, tablet, personal digital assistant (PDA), or any other suitable mobile device capable of receiving and processing network and/or SPS signals.

Figure 3:
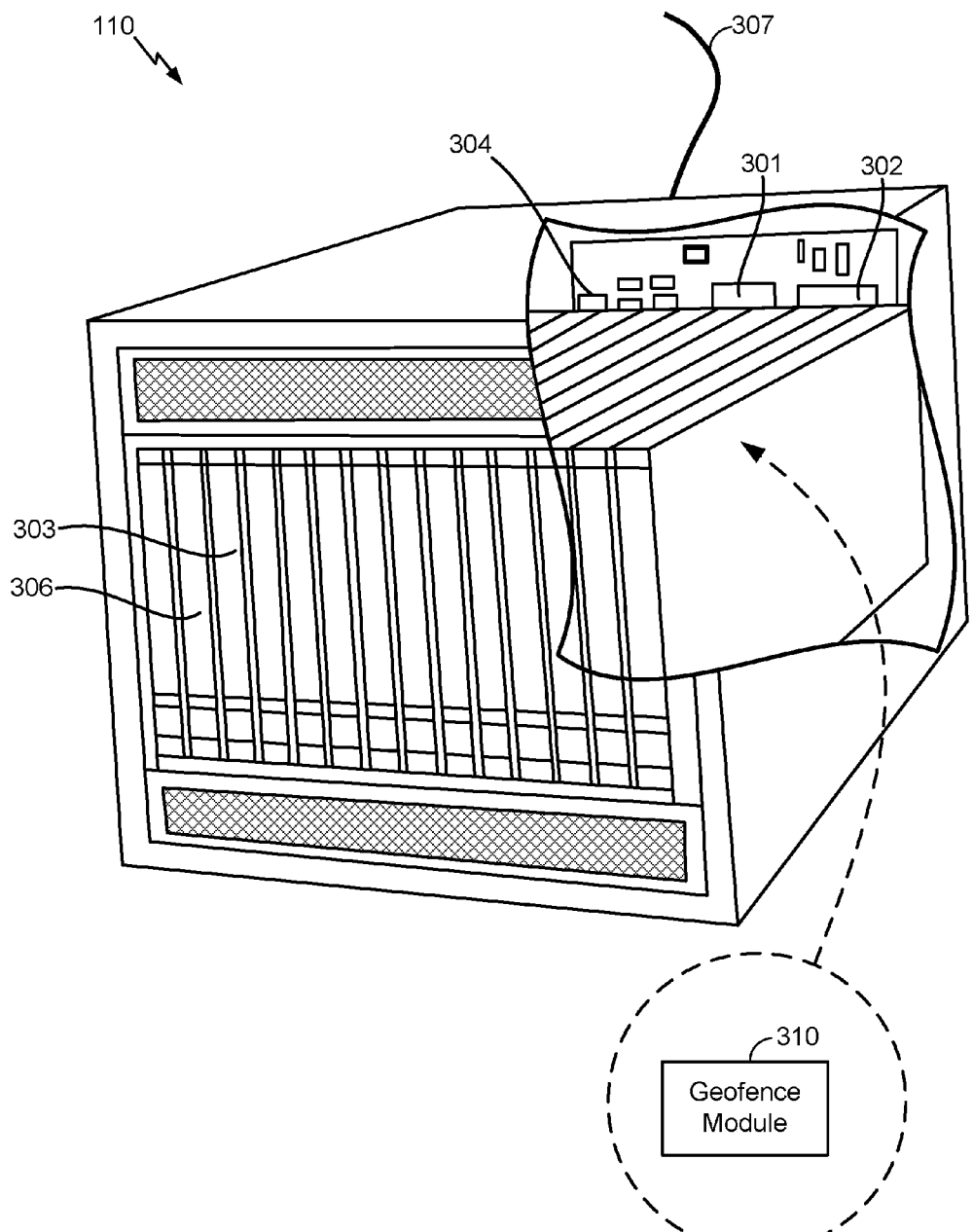
FIG. 3 illustrates a positioning server in accordance with at least one embodiment of the disclosure.

Various embodiments may be implemented on any of a variety of commercially available server devices, such as the positioning server 110 illustrated in FIG. 3. The positioning server 110 includes a processor 301 coupled to volatile memory 302 and a large capacity nonvolatile memory, such as a disk drive 303. The positioning server 110 may also include a floppy disc drive, compact disc (CD) or digital video disc (DVD) drive 306 coupled to the processor 301. The positioning server 110 may also include network access ports 304 coupled to the processor 301 for establishing data connections with a network 307, such as a local area network coupled to other broadcast system computers and servers or to the Internet. The positioning server 110 further includes a geofence module 310, as described further herein.

In emergency situations (e.g., natural disasters, riots, traffic accidents, missing persons alerts, terrorist attacks, etc.), the "network" (e.g., the positioning server 110 via the network 112) may identify one or more geographic areas associated with the emergency situation where it would be beneficial to receive additional information from mobile devices (such as the mobile device 108) in those areas. The positioning server 110 (more specifically the geofence module 310) may therefore setup one or more geofences corresponding to the identified geographic area(s). The positioning server 110 can then push the geofence(s) to the mobile devices near or within the area(s) encompassed by the geofence(s), or the mobile devices may download the geofence(s) from the positioning server 110 based on, for example, receiving a notification from the positioning server 110 to do so.

The positioning server 110 may request the mobile devices receiving the geofence(s) to crowdsource data relevant to the emergency situation, such as the MAC IDs of nearby devices, Bluetooth® beacons, received signal strength indications (RSSIs), environmental sensor data (e.g., pressure, temperature, etc.). Other useful data may include traffic conditions, accident reports, photos, videos, and other information that may require active user participation. This information allows the positioning server 110 to gather information about users who may have lost WWAN access but still have functional WiFi or Bluetooth®.

Alternatively, the positioning server 110 may send the geofence(s) to the mobile devices and request that the associated users avoid the area(s) encompassed by the geofence(s).

Prior art solutions focus on the network-based geofence creation and on the sensor information requested by the network and crowdsourced by the mobile devices. In contrast, the present disclosure focuses on the actions taken by the mobile device 108 when a network-based geofence is received.

Generally, to conserve power, the mobile device 108 will use WWAN/WLAN signals and IDs to detect the breach of a geofence. Because of the higher power requirements, the mobile device 108 only infrequently uses GNSS-based position fixes. Thus, the positioning server 110 can attach a priority level to any network-based geofence it sends to the mobile device 108. The priority level is typically based on the level of importance of the geofence to the user or the positioning server 110. Geofences associated with dangerous areas to be avoided may be given the highest priority, whereas geofences to collect situation-aware crowdsourced information may be given a lower priority (e.g., geofences that ask the mobile device 108 to share pressure and temperature data or to take photos when in the vicinity of the geofence).

Based on the priority level of the received network-based geofence, the mobile device 108 can choose a geofence breach detection method and evaluation rate, thereby allowing the mobile device 108 to tradeoff between breach detection confidence, responsiveness, and power usage based on the priority of the geofence. For example, when a high-priority geofence is received, a mobile device 108 that is outdoors may choose to use GNSS-based position fixes as the geofence breach detection method at an evaluation rate of 1 Hz to determine whether the mobile device 108 is approaching or leaving the geofence. The mobile device 108 may turn off dynamic power optimization (e.g., where the GNSS engine is put in a low power mode) when it is very close to the boundary of the geofence to more accurately identify a breach of the geofence. In contrast, a mobile device 108 that is indoors may switch from a low-power detection scheme (e.g., monitoring an associated AP, set of APs, machine learning based, etc.) as the geofence breach detection method to a more precise indoor positioning method that uses, for example, RSSI/RTT, as the geofence breach detection method.

The network-based geofence(s) received by the mobile device 108 may be nested geofences. More specifically, the positioning server 110 may define a set of nested geofences with an associated set of nested priorities in areas where the danger is localized. For example, the positioning server 110 may define a set of nested geofences as a set of concentric circles centered at the location of an emergency situation. The associated priorities of the nested concentric circles may increase for concentric circles closer to the emergency situation. The mobile device 108 may switch the geofence breach detection method and evaluation rate as it moves within the set of nested geofences.

Figure 4:
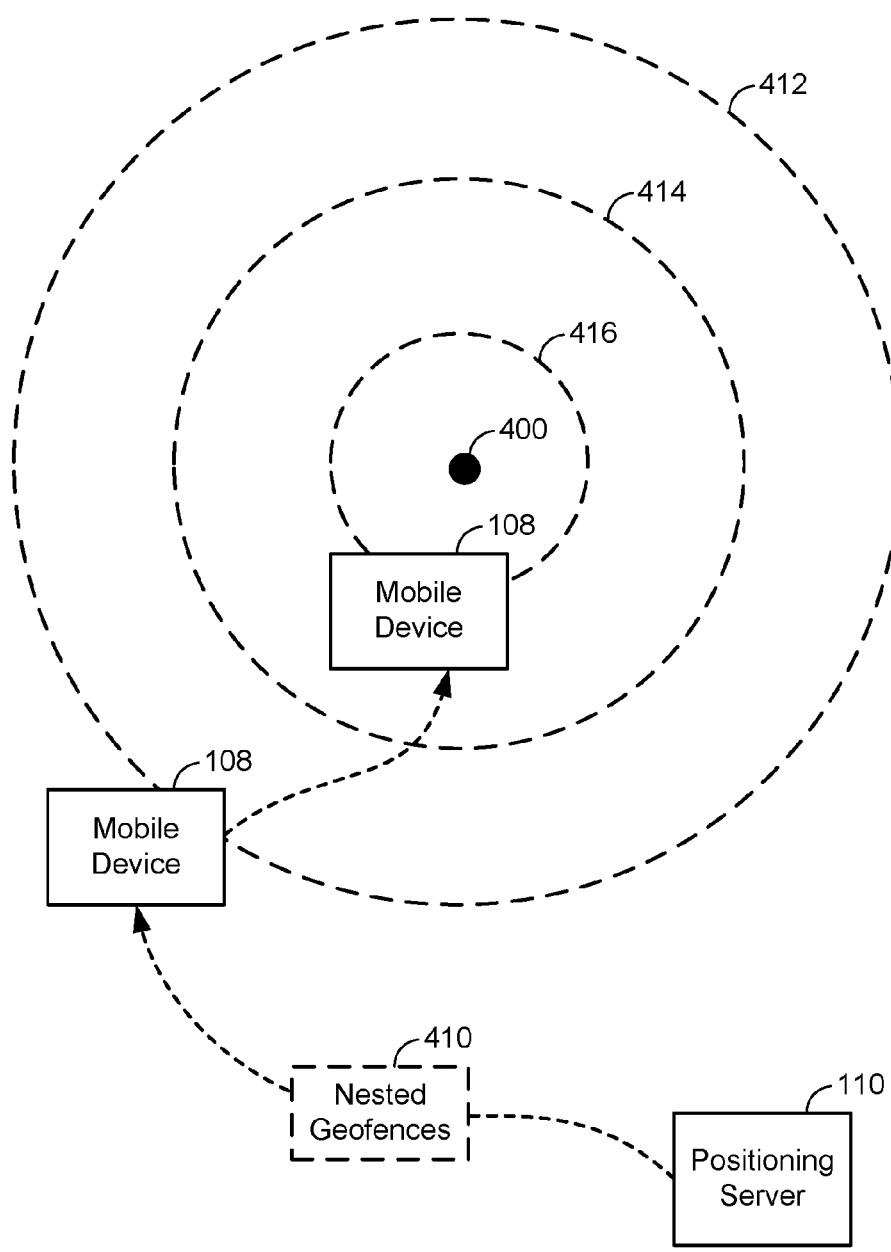
FIG. 4 illustrates an example of the mobile device moving within a set of nested geofences with associated priorities according to at least one aspect of the disclosure.

FIG. 4 illustrates an example of the mobile device 108 moving within a set of nested geofences with associated priorities according to at least one aspect of the disclosure. As illustrated in FIG. 4, the positioning server 110 sends a set of nested geofences 410 associated with an event, such as an emergency situation, occurring at a location 400 to the mobile device 108. In the example of FIG. 4, the set of nested geofences 410 include an outermost geofence 412, an inner geofence 414, and an innermost geofence 416 around the location 400. Note that although FIG. 4 illustrates three nested geofences, there may be more than three or fewer than three geofences.

Each of the geofences 412-416 has an associated priority level. The priority level of innermost geofence 416 is higher than the priority level of inner geofence 414, which is higher than the priority level of outermost geofence 412. A priority level may be represented as a numeric value, for example, 1 to 5 or 1 to 10, or by name, for example, "low," "medium low," "medium," "medium high," and "high." The priority levels may depend on the type of event occurring at the location 400 (e.g., the priority level of a natural disaster may be higher than the priority level of a traffic accident), the type of mobile device (e.g., where the event is a traffic accident and the mobile device 108 is a vehicle navigation device, the priority levels of the geofences 412-416 may be higher than if the mobile device 108 were a laptop computer), the type of user of the mobile device 108 (e.g., the priority levels of the geofences 412-416 may be higher for mobile devices belonging to emergency responders than to civilians to assist the emergency responders to more accurately navigate to the location 400), etc.

The mobile device 108 may switch to a more accurate geofence breach detection method and/or a more frequent evaluation rate as it crosses from one geofence of the geofences 412-416 to another based on the priority of the geofence. More specifically, when the mobile device 108 enters an area bounded by a nested geofence having a higher priority level than an area outside of the area bounded by the nested geofence (e.g., as the mobile device 108 crosses into the area bounded by inner geofence 414 from the area bounded by the outermost geofence 412), the mobile device 108 can switch to a more accurate geofence breach detection method and/or to a higher evaluation rate. For example, the mobile device 108 can switch to a more accurate geofence breach detection method and/or to a higher evaluation rate as the mobile device crosses the nested geofence in a direction toward the nested geofence having a higher priority level, for example, in a direction towards the event.

For example, outside of the outermost geofence 412, the mobile device 108 may simply use the identifier of the WAN-WAP 104 to which it is attached to determine its position. Inside of the outermost geofence 412, but outside of the inner geofence 414, however, the mobile device 108 may use TOA techniques from signals provided by the WAN-WAPs 104a-104c as the geofence breach detection method. Upon crossing into the inner geofence 414, the mobile device 108 may switch to a geofence breach detection method based on signaling received from the LAN-WAPs 106a-106e, if available. Alternatively, if not available, the mobile device 108 may use a GNSS-based positioning method as the geofence breach detection method, but at a low frequency evaluation rate in a low power mode (i.e., in a dynamic power optimization mode). Then, upon crossing into the innermost geofence 416, the mobile device 108 may turn off the dynamic power optimization mode and switch to a higher evaluation rate for determining its GNSS-based position as the geofence breach detection method. In this way, the mobile device 108 can more accurately determine when and where it breaches a geofence having a higher priority level. As will be appreciated, these are merely exemplary geofence breach detection methods and evaluation rates, and the disclosure is not limited to these examples.

Note, the event at the location 400 does not have to be an emergency situation, but rather, can be any event in which a user of the mobile device 108 may be interested. Further, although FIG. 4 illustrates the positioning server 110 sending the mobile device 108 a single set of nested geofences 410 for a single event at the location 400, it will be appreciated that the positioning server 110 can send one or more geofences (nested or otherwise) to the mobile device 108 for each of a plurality of different events, as illustrated in FIG. 5.

Figure 5:
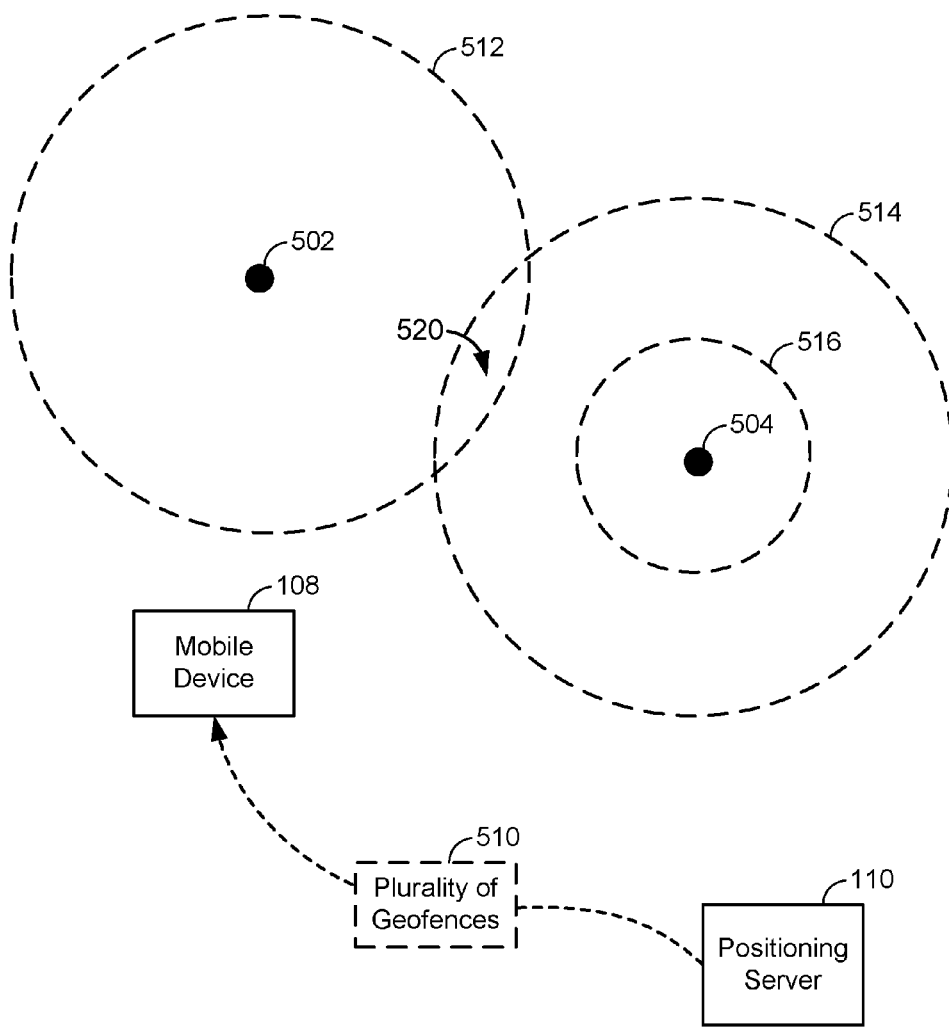
FIG. 5 illustrates an example of the mobile device receiving a plurality of geofences with associated priorities according to at least one aspect of the disclosure.

FIG. 5 illustrates an example of the mobile device 108 receiving a plurality of geofences with associated priorities according to at least one aspect of the disclosure. As illustrated in FIG. 5, the positioning server 110 sends a plurality of geofences 510 associated with a plurality of events occurring at a corresponding plurality of locations 502 and 504 to the mobile device 108. The positioning server 110 may send the plurality of geofences 510 to the mobile device 108 because the mobile device 108 is within a threshold distance of the locations 502 and 504. It may also not be readily apparent towards which of the locations 502 and 504 the mobile device 108 is travelling.

In the example of FIG. 5, the plurality of geofences 510 include a single geofence 512 around the location 502 and two nested geofences 514 and 516 (with geofence 516 being an inner geofence) around the location 504. Note that although FIG. 5 illustrates two nested geofences around location 504, there may be more than two or fewer than two geofences. Similarly, there may be more than one geofence around the location 502.

As discussed above with reference to FIG. 4, each of the geofences 512-516 has an associated priority level. The priority level of the geofence 516 should be higher than the priority level of the geofence 514. The priority level of the geofence 512 may be unrelated to the priority levels of the geofences 514 and 516, and the geofence 512 is associated with a different event/location. As also described above with reference to FIG. 4, the mobile device 108 may switch to a more accurate geofence breach detection method and/or a more frequent evaluation rate as it crosses into the geofence 512 and/or the 514, and from the geofence 514 to the geofence 516.

As illustrated in FIG. 5, the geofences 512 and 514 overlap with each other (although as will be appreciated, they need not overlap). When the mobile device 108 is in the overlap area 520, the mobile device 108 should employ the geofence breach detection method and evaluation rate associated with the higher priority level of the priority levels associated with the geofences 512 and 514. For example, where the geofence breach detection method and evaluation rate associated with the priority level of the geofence 514 is lower than the geofence breach detection method and evaluation rate associated with the priority level of the geofence 512, and where the mobile device 108 has crossed into the overlap area 520 from the geofence 514 and is traveling further into the geofence 512, the mobile device 108 should switch to the geofence breach detection method and evaluation rate associated with the higher priority level of the geofence 512, even though it is still within the geofence 514. However, where the mobile device 108 has crossed into the overlap area 520 from the geofence 512 and is traveling further into the geofence 514, the mobile device 108 should continue to use the higher geofence breach detection method and evaluation rate associated with the priority level of the geofence 512 until it exits the geofence 512.

As briefly noted above, the mobile device 108 may report information back to the positioning server 110 when it is within a network-based geofence. The mobile device 108 and the positioning server 110 utilize a request/acknowledgement scheme where the goal is for the positioning server 110 to gather information about the devices within a geofence, for example, the number and identity of such devices. This may be useful to identify users that are trapped in an emergency situation and/or that have lost WWAN connectivity but are still utilizing, or attempting to utilize, WiFi and/or Bluetooth® connectivity.

The positioning server 110 may push a geofence (or multiple geofences, as described above) to the mobile device 108, or the mobile device 108 may download a geofence from the positioning server 110, as described above. The positioning server 110 may include a request with the geofence to report back if the mobile device 108 is within the geofence. At this time, the mobile device 108 may perform some positioning method and report only its position back to the positioning server 110. No other crowd-sourced information needs to be sent back to the positioning server 110 at this point.

Once the mobile device 108 is within the geofence, however, the mobile device 108 may, based on the request from the positioning server 110 included with the geofence, scan for neighboring devices and provide their MAC addresses to the positioning server 110. The positioning server 110 can cross check this information with the known mobile devices within the geofence, and in this way, may identify users that are trapped in an emergency situation and/or that have lost WWAN connectivity but are still utilizing, or attempting to utilize, WiFi and/or Bluetooth® connectivity.

Although the foregoing has described the geofences 512-516 and associated priorities as being sent by the positioning server 110, in an embodiment, another mobile device that is a peer device of the mobile device 108 may perform the functionality described herein as being performed by the positioning server 110.

Figure 6:
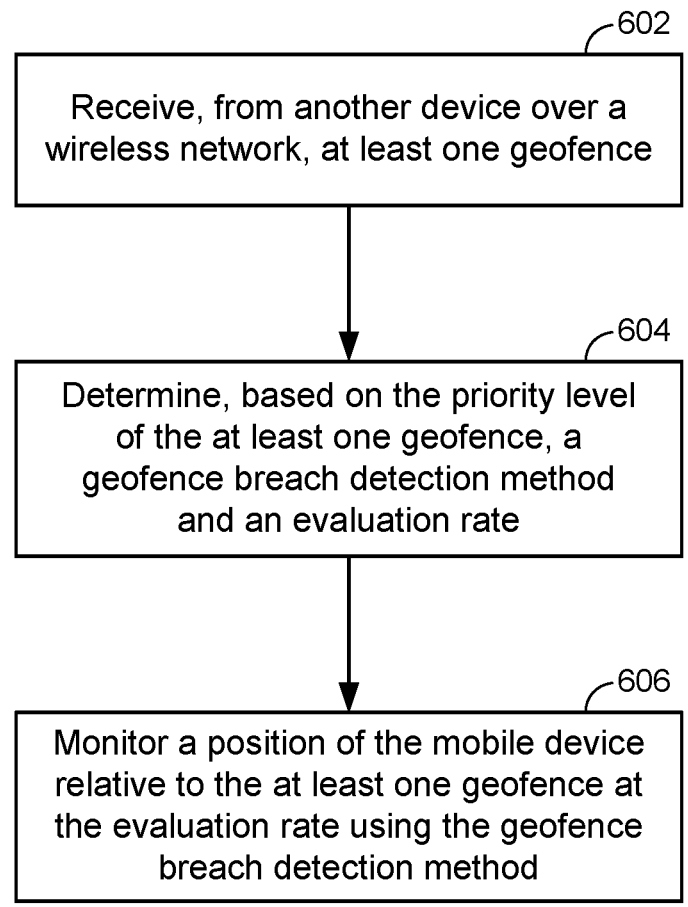
FIG. 6 illustrates an exemplary flow for utilizing priority based geofences according to at least one aspect of the disclosure.

FIG. 6 illustrates an exemplary flow for utilizing priority based geofences according to at least one aspect of the disclosure. The flow illustrated in FIG. 6 may be performed by the mobile device 108.

At 602, the mobile device 108, for example, the antenna (s) 202 in conjunction with the WAN transceiver 204 and/or the LAN transceiver 206, receives, from another device (e.g., the positioning server 110 or a peer device of the mobile device 108 where the wireless network is a peer-to-peer network) over a wireless network, at least one geofence. As discussed herein, each of the at least one geofence may have an assigned priority level indicating an importance of the at least one geofence. The assigned priority level may be one of a plurality of priority levels and may be received from the other device over the wireless network.

At 604, based on the priority level of the at least one geofence, the mobile device 108, for example, the processor 210 in conjunction with the geofence module 232, determines a geofence breach detection method and an evaluation rate. The geofence breach detection method may be a position determination method. The position determination method may utilize one of GNSS-based positioning (e.g., GPS) or terrestrial-based positioning (e.g., based on signals received from the WAN-WAPs 104a-104c or the LAN-WAP 106a-106e, RTT, AFLT, etc.). Alternatively, the geofence breach detection method may be based on detection or lack of detection of wireless signals from one or more access points, such as radio-frequency identification (RFID) or near field communication (NFC) tags or readers, WiFi or Bluetooth® access points, and the like.

At 606, the mobile device 108, for example, the wireless-based positioning module 216, monitors a position of the mobile device 108 relative to the at least one geofence at the evaluation rate using the geofence breach detection method.

In an embodiment, the at least one geofence may define a geographic area associated with a location of an event, such as a natural disaster, a riot, a traffic accident, a missing person alert, a terrorist attack, etc. As discussed above with reference to FIG. 4, the at least one geofence may include a plurality of nested geofences around the location of the event, wherein the assigned priority level of each nested geofence indicates the importance of the nested geofence. Geofences of the plurality of nested geofences closer to the location of the event may have a higher priority than geofences of the plurality of nested geofences further from the location of the event. As described above, the mobile device 108 may switch to a more accurate geofence breach detection method and/or to a higher evaluation rate as the position of the mobile device 108 crosses a geofence of the plurality of nested geofences, thereby entering an area bounded by the nested geofence having a higher priority level than an area outside of the area bounded by the nested geofence.

Further, although not illustrated in FIG. 6, the flow illustrated in FIG. 6 may further include receiving, over the wireless network from the other device, a request to report the position of the mobile device 108 to the other device based on the mobile device 108 being within the at least one geofence. The mobile device 108 may send the position of the mobile device 108 to the other device over the wireless network in response to the request to report the position of the mobile device 108. Based on the mobile device 108 being within the at least one geofence, the mobile device 108 may also send sensor information from sensors of the mobile device 108 to the other device over the wireless network. The sensor information may include information derived from wireless beacons detected by the mobile device 108 (e.g., Bluetooth® or WiFi beacons), RSSIs, environmental information (e.g., temperature, pressure, etc.), images of an environment of the mobile device 108, audio recordings of an environment of the mobile device 108, or any combination thereof.

Alternatively, or additionally, based on the mobile device 108 being within the at least one geofence, the mobile device 108 may scan for neighboring devices. The mobile device 108 may send identifiers of the neighboring devices to the other device over the wireless network. The identifiers of the neighboring mobile devices may be MAC addresses of the neighboring devices.

Figure 7:
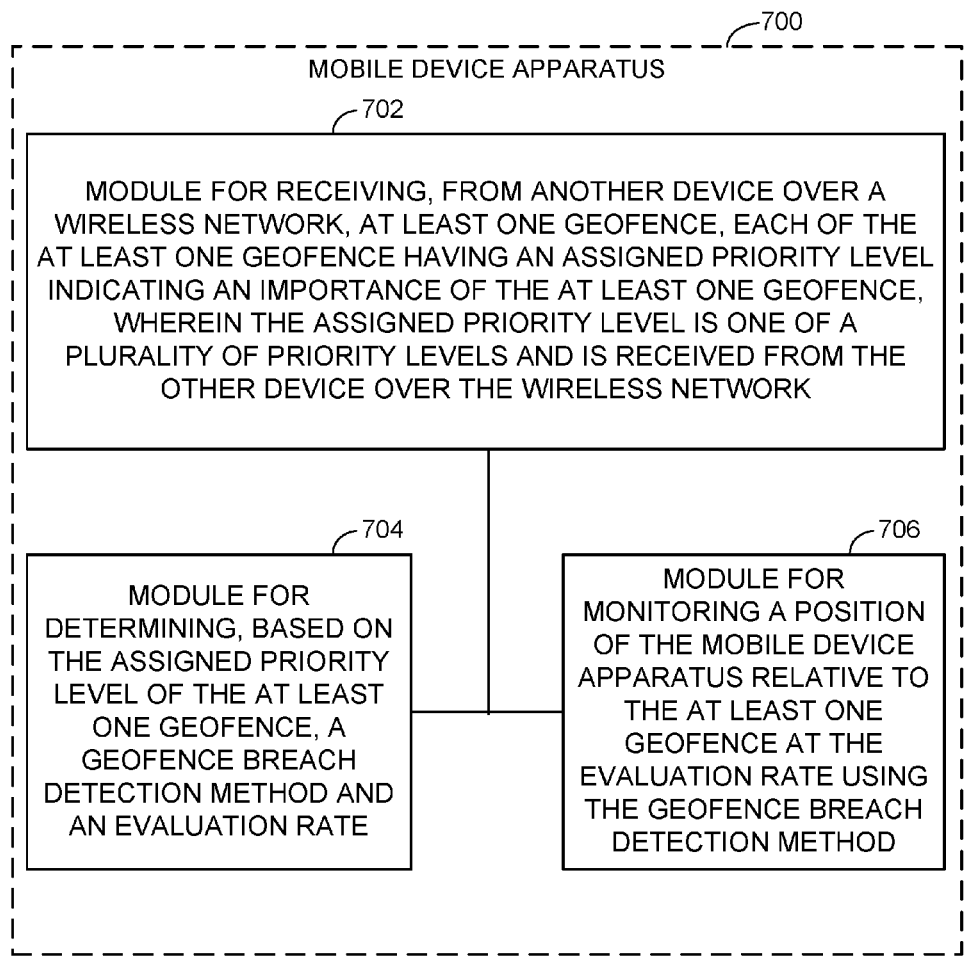
FIG. 7 is a simplified block diagram of several sample aspects of an apparatus configured to support communication as taught herein.

FIG. 7 illustrates an example base station apparatus 700 represented as a series of interrelated functional modules. A module for receiving 702 may correspond at least in some aspects to, for example, a communication device, such as WAN transceiver 204 and/or LAN transceiver 206 in FIG. 2, as discussed herein. A module for determining 704 may correspond at least in some aspects to, for example, a processing system, such as processor 210 in FIG. 2, as discussed herein. A module for monitoring 706 may correspond at least in some aspects to, for example, a processing system in conjunction with a communication device, such as processor 210 in conjunction with WAN transceiver 204 and/or LAN transceiver 206 in FIG. 2, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an ASIC, an field-programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in Random-Access Memory (RAM), flash memory, Read-Only Memory (ROM), Erasable Programmable ROM (EPROM), Electrically Erasable Programmable ROM (EEPROM), registers, hard disk, a removable disk, a Compact Disc Read-Only Memory (CD-ROM) drive, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for utilizing priority based geofences, comprising:
   receiving, at a mobile device from an other device over a wireless network, a plurality of nested geofences around a location of an event, each nested geofence of the plurality of nested geofences having an assigned priority level indicating an importance of the nested geofence, wherein the assigned priority level is one of a plurality of priority levels and is received from the other device over the wireless network;
   based on the assigned priority level of at least one of the plurality of nested geofences, determining, by the mobile device, a geofence breach detection method and an evaluation rate; and
   monitoring, by the mobile device, a position of the mobile device relative to the at least one of the plurality of nested geofences at the evaluation rate using the geofence breach detection method.

2. The method of claim 1, wherein the geofence breach detection method comprises a position determination method.

3. The method of claim 2, wherein the position determination method utilizes one of global navigation satellite system (GNSS)-based positioning or terrestrial-based positioning.

4. The method of claim 1, wherein the geofence breach detection method is based on detection or lack of detection of wireless signals from one or more access points.

5. The method of claim 1, wherein the at least one of the plurality of nested geofences defines a geographic area associated with the location of the event.

6. The method of claim 5, wherein geofences of the plurality of nested geofences closer to the location of the event have a higher priority than geofences of the plurality of nested geofences further from the location of the event.

7. The method of claim 6, wherein the mobile device switches to a more accurate geofence breach detection method and/or to a higher evaluation rate as the position of the mobile device crosses a geofence of the plurality of nested geofences in a direction toward the event.

8. The method of claim 1, further comprising:
   receiving, over the wireless network from the other device, a request to report the position of the mobile device to the other device based on the mobile device being within the at least one of the plurality of nested geofences; and
   sending the position of the mobile device to the other device over the wireless network in response to the request to report the position of the mobile device.

9. The method of claim 8, further comprising:
   based on the mobile device being within the at least one of the plurality of nested geofences, sending sensor information from sensors of the mobile device to the other device over the wireless network.

10. The method of claim 9, wherein the sensor information comprises information derived from wireless beacons detected by the mobile device, received signal strength indications (RSSIs), environmental information, images of an environment of the mobile device, audio recordings of an environment of the mobile device, or any combination thereof.

11. The method of claim 8, further comprising:
    based on the mobile device being within the at least one of the plurality of nested geofences, scanning for neighboring devices; and
    sending identifiers of the neighboring devices to the other device over the wireless network.

12. The method of claim 11, wherein the identifiers of the neighboring devices comprise media access control (MAC) addresses of the neighboring devices.

13. The method of claim 1, wherein the other device comprises a positioning server.

14. The method of claim 1, wherein the other device comprises a peer device of the mobile device, and wherein the wireless network comprises a peer-to-peer network.

15. An apparatus for utilizing priority based geofences, comprising:
    a transceiver of a mobile device configured to receive, from an other device over a wireless network, a plurality of nested geofences around a location of an event, each nested geofence of the plurality of nested geofences having an assigned priority level indicating an importance of the nested geofence, wherein the assigned priority level is one of a plurality of priority levels and is received from the other device over the wireless network; and
    at least one processor of the mobile device configured to determine, based on the assigned priority level of at least one of the plurality of nested geofences, a geofence breach detection method and an evaluation rate, and to monitor a position of the mobile device relative to the at least one of the plurality of nested geofences at the evaluation rate using the geofence breach detection method.

16. The apparatus of claim 15, wherein the geofence breach detection method comprises a position determination method.

17. The apparatus of claim 15, wherein the geofence breach detection method is based on detection or lack of detection of wireless signals from one or more access points.

18. The apparatus of claim 15, wherein the at least one of the plurality of nested geofences defines a geographic area associated with the location of the event.

19. The apparatus of claim 18, wherein geofences of the plurality of nested geofences closer to the location of the event have a higher priority than geofences of the plurality of nested geofences further from the location of the event.

20. The apparatus of claim 19, wherein the mobile device switches to a more accurate geofence breach detection method and/or to a higher evaluation rate as the position of the mobile device crosses a geofence of the plurality of nested geofences in a direction toward the event.

21. The apparatus of claim 15, wherein the transceiver is further configured to:
receive, over the wireless network from the other device, a request to report the position of the mobile device to the other device based on the mobile device being within the at least one of the plurality of nested geofences; and
send the position of the mobile device to the other device over the wireless network in response to the request to report the position of the mobile device.

22. The apparatus of claim 21, wherein the transceiver is further configured to:
send, based on the mobile device being within the at least one of the plurality of nested geofences, sensor information from sensors of the mobile device to the other device over the wireless network.

23. The apparatus of claim 22, wherein the sensor information comprises information derived from wireless beacons detected by the mobile device, received signal strength indications (RSSIs), environmental information, images of an environment of the mobile device, audio recordings of an environment of the mobile device, or any combination thereof.

24. The apparatus of claim 21, wherein the transceiver is further configured to:
scan, based on the mobile device being within the at least one of the plurality of nested geofences, for neighboring devices; and
send identifiers of the neighboring devices to the other device over the wireless network.

25. The apparatus of claim 15, wherein the other device comprises a positioning server.

26. The apparatus of claim 15, wherein the other device comprises a peer device of the mobile device, and wherein the wireless network comprises a peer-to-peer network.

27. An apparatus for utilizing priority based geofences, comprising:
a communication means of a mobile device for receiving, from an other device over a wireless network, a plurality of nested geofences around a location of an event, each nested geofence of the plurality of nested geofences having an assigned priority level indicating an importance of the nested geofence, wherein the assigned priority level is one of a plurality of priority levels and is received from the other device over the wireless network; and
a processing means of the mobile device for determining, based on the assigned priority level of at least one of the plurality of nested geofences, a geofence breach detection method and an evaluation rate, and for monitoring a position of the mobile device relative to the at least one of the plurality of nested geofences at the evaluation rate using the geofence breach detection method.

28. A non-transitory computer-readable medium storing computer-executable instructions for utilizing priority based geofences, the computer-executable instructions comprising:
at least one instruction instructing a mobile device to receive, from an other device over a wireless network, a plurality of nested geofences around a location of an event, each nested geofence of the plurality of nested geofences having an assigned priority level indicating an importance of the nested geofence, wherein the assigned priority level is one of a plurality of priority levels and is received from the other device over the wireless network;
at least one instruction instructing the mobile device to determine, based on the assigned priority level of at least one of the plurality of nested geofences, a geofence breach detection method and an evaluation rate; and
at least one instruction instructing the mobile device to monitor a position of the mobile device relative to the at least one of the plurality of nested geofences at the evaluation rate using the geofence breach detection method.

* * * * *